(12) United States Patent
Elzoghbi

(10) Patent No.: US 11,080,716 B2
(45) Date of Patent: *Aug. 3, 2021

(54) SYSTEM AND METHOD FOR UNIFIED PRODUCT RECALLS ANALYTICS AND NOTIFICATION PLATFORM

(71) Applicant: Hadafsoft, LLC, Woodinville, WA (US)

(72) Inventor: Mostafa Elzoghbi, Woodinville, WA (US)

(73) Assignee: HADASOFT, LLC, Woodinville, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/826,361

(22) Filed: Mar. 23, 2020

(65) Prior Publication Data

US 2020/0242622 A1 Jul. 30, 2020

Related U.S. Application Data

(63) Continuation-in-part of application No. 15/276,925, filed on Sep. 27, 2016, now Pat. No. 10,636,037, which is a continuation-in-part of application No. 14/726,599, filed on May 31, 2015, now abandoned.

(60) Provisional application No. 62/006,254, filed on Jun. 1, 2014.

(51) Int. Cl.
*G06Q 30/00* (2012.01)
*G06Q 10/08* (2012.01)
*G06Q 10/10* (2012.01)
*G06Q 20/10* (2012.01)

(52) U.S. Cl.
CPC ....... *G06Q 30/014* (2013.01); *G06Q 10/0837* (2013.01); *G06Q 10/10* (2013.01); *G06Q 20/10* (2013.01); *G06Q 30/016* (2013.01)

(58) Field of Classification Search
None
See application file for complete search history.

(56) References Cited

U.S. PATENT DOCUMENTS

| | | | |
|---|---|---|---|
| 8,694,327 B2* | 4/2014 | Kolodziej | G06Q 30/02 705/302 |
| 2004/0046033 A1* | 3/2004 | Kolodziej | G06Q 30/02 235/487 |
| 2005/0203758 A1* | 9/2005 | Blum | G06Q 10/06 705/302 |
| 2006/0111924 A1* | 5/2006 | Hollich | G06Q 90/00 705/302 |
| 2008/0281658 A1* | 11/2008 | Siessman | G06Q 30/012 705/302 |
| 2009/0319331 A1* | 12/2009 | Duffy | G06Q 30/0201 705/7.29 |

(Continued)

*Primary Examiner* — Maria C Santos-Diaz
(74) *Attorney, Agent, or Firm* — Michael Ferrell

(57) ABSTRACT

The invention is a platform that defines a new way and method of notifying and connecting a customer to a business with a recalled product and accelerating the refund, replacement or the fix of the product to the customer. The invention comprises processed data algorithms and techniques along with new extensions that integrate with existing systems or software. The platform facilitates the communication between users and manufacturers to provide customers with their refund, fix or replacement for defective products through a resolution center.

20 Claims, 15 Drawing Sheets

(56) References Cited

U.S. PATENT DOCUMENTS

| | | | | |
|---|---|---|---|---|
| 2013/0238356 | A1* | 9/2013 | Torii | G06Q 10/06 |
| | | | | 705/2 |
| 2013/0268445 | A1* | 10/2013 | Casady | G06Q 30/014 |
| | | | | 705/303 |
| 2015/0012294 | A1* | 1/2015 | Casady | G06Q 50/24 |
| | | | | 705/2 |
| 2015/0026074 | A1* | 1/2015 | Cotten | G06Q 30/012 |
| | | | | 705/302 |
| 2015/0032638 | A1* | 1/2015 | Dintenfass | G06Q 30/012 |
| | | | | 705/302 |
| 2015/0032639 | A1* | 1/2015 | Cherifi | G06Q 30/014 |
| | | | | 705/303 |
| 2015/0088764 | A1* | 3/2015 | Sassan | G06Q 30/012 |
| | | | | 705/302 |
| 2015/0234995 | A1* | 8/2015 | Casady | G06Q 50/22 |
| | | | | 705/2 |
| 2015/0242803 | A1* | 8/2015 | Morby | G06Q 10/087 |
| | | | | 705/28 |
| 2016/0086189 | A1* | 3/2016 | Chitre | G06Q 30/0633 |
| | | | | 705/26.8 |
| 2017/0337559 | A1* | 11/2017 | Hancock | G06Q 10/087 |
| 2018/0121263 | A9* | 5/2018 | Li | G06F 16/9535 |

\* cited by examiner

Recall Title: Island Soups Company, Inc. Recalls Six Varieties of Island Soups Brand Products Because of Possible Contamination With Clostridium Botulinum
Manufacturer Name: Island Soups Company, Inc.
We would like to advise you to contact the supplier to get a refund, replacement or a fix for the recalled item. Submit a claim now: [Add Claim]

eRecall saves lives by capturing recalled items that you own. Help us raise the awareness of these recalls by inviting your friends to join.

Make sure to update your purchased items using Products Center synchronization tools.

eRecall iOS app is available in the app store, download it for free here.

Regards,
The eRecall Team

Resolution Center | By Status | By Manufacturer | By Category

Recall Subject    09/18/2016
Brand: abc    Recall #: 1001    Messages: 5    Status: Open Recall Subject    08/18/2016
Brand: abc    Recall #: 1002    Messages: 15    Status: Closed Recall Subject    09/18/2015
Brand: abc    Recall #: 1201    Messages: 5    Status: Resolved

FIG. 15

SYSTEM AND METHOD FOR UNIFIED PRODUCT RECALLS ANALYTICS AND NOTIFICATION PLATFORM

CLAIM FOR PRIORITY

This application is a continuation-in-part of U.S. patent application Ser. No. 15/276,925 of the same title, filed Sep. 27, 2016, now U.S. Pat. No. 10,636,037. Application Ser. No. 15/276,925 is a continuation-in-part of U.S. patent application Ser. No. 14/726,599 filed May 31, 2015. U.S. patent application Ser. No. 14/726,599 was based on U.S. Provisional Patent Application Ser. No. 62/006,254 filed Jun. 1, 2014. The priorities of the foregoing applications are hereby claimed and their disclosures incorporated herein by reference.

BACKGROUND OF THE INVENTION

Field of the Invention

This invention relates generally to customer product recalls and more particularly, to an improved system and method for supporting product recall notification and refund, fix or replacement.

Prior Art

Every year billions of dollars is wasted and millions of people are potentially affected by defective products. The United States Department of Agriculture has estimated in 2014 that foodborne illnesses cost more than $15.6 Billion annually for the U.S. economy. These illnesses sicken more than 8.9 million Americans and result in the hospitalization and loss of lives for thousands of Americans. Moreover, at least five U.S. deaths have been attributed to the Japanese auto parts maker Takata which caused the company to recall the airbags of 34 million automobiles in May 2015. Product recalls are not limited to vehicles and food, the potential to cause harm can come from drugs, medical products, household goods or anything that a consumer may use.

Existing and conventional product recall sites lack the proper communication channels to notify product consumers of recalls; existing systems publish product recalls information through web pages, web sites, blogs, watch lists, using different data formats without a guarantee that this information will be delivered to all consumers. Therefore, it is not trivial to provide a personalized and effective way to notify a customer for a recalled product at the time of purchase or after the purchase. Also, existing systems lack the tools or methods for businesses to detect, report and analyze product recalls once a legal notice is issued for a product in their inventory or is being manufactured.

In today's ecommerce environment online presence and online shopping is widespread and there is a need in the art for a method to notify consumers of recalls and obtain the refund, fix or replacement without forcing consumers to search for recalls themselves on retailer's websites.

As an example the website http://www.worldmarketcorp-.com/product-recalls publishes recalls notices of products that were sold at the Cost Plus World Market retail stores and online site. Consumers have to check the site themselves monthly. They have to click on each product notice separately and match their product to the Stock Keeping Unit (SKU) of the recalled item. After validating that the product matches they have to find the nearest Cost Plus World Market store. This manual searching and checking of SKUs wastes consumers' time, lengthens the time that consumers are at risk from getting injured and makes the process of getting the refund or replacement take longer.

Another website http://www.target.com posts product recall notices for items sold at Target stores and online at Target.com. The recalls are posted for up to 240 days and here too consumers have to select individual notices, manually match the SKUs or Target Item Number (DPCI) and then clicking on the manufacturer's website link. This leaves the consumer alone in contacting the manufacturer for a refund or replacement lengthening the time it takes to get a resolution.

The website http://corporate.walmart.com/recalls is where Walmart stores post the recalled items which were sold at Walmart and Sam's Club brick and mortar stores and online. The posts send consumers to the government sites such as the U.S. Food and Drug Administration (FDA) which have the product recall information. Consumers have to search through the posts to find how to submit a claim. Essentially, consumers have to traverse 3 sites to be able to get a resolution, Walmart's website, the FDA (or other government agency) then the manufacturer's site to put in a claim. This is cumbersome and the need for a better service is apparent.

The invention is a platform comprised of the tools, processes, applications, services, extensions and the interface to integrate with existing business systems to provide immediate communication channels between product manufacturers and consumers. This facilitates customer safety and enhances the reputation of manufacturers.

Inventors have previously created systems and methods to solve the problem of notifying consumers of recalls but it is clear that we need a contemporary platform, to connect consumers with businesses to get a fix, refund or replacement for a recalled product. The platform would enhance safety for customers and a better credibility to the manufacture or seller.

Several methods and systems for product recall notifications have been proposed but they do not address how consumers can receive their fix, refund or replacement product in a streamlined way. U.S. Pat. No. 7,967,201 to Bowlus (2011) discloses a system and method to deter purchases of recalled products at the check-out scanner or register to prevent the sale of a recalled item. But it does not address eCommerce sites or how a consumer can receive their refund. U.S. Patent Application 20130268445 published Oct. 10, 2013 (inventors Peter Casady and Jim Sipe) describes a process to match medical recall information to the provider's inventory and alert healthcare personnel of a recall of the medical device. This matching system does not address how a consumer could get a refund or replacement for the medical device. U.S. Pat. No. 8,473,313 to Abreu (2013) discloses an automated system and method for communicating recalls to consumers through a central computer but it does not describe how the consumer can receive their replacement, fix or refund from the supplier or manufacturer using the system.

Similarly, U.S. Pat. No. 8,036,914 to Pinsonneault (2011) discloses a system and method for supporting product or drug recalls but does not address how a consumer can get the refund of replacement medicine or medical device. U.S. Patent Application 20090204415 of Beira published Aug. 13, 2009 addresses the need for checking the recall status of a product and generating a notification to a user device accordingly but it does not address how a consumer can communicate with the manufacturer or supplier to get a replacement or refund.

U.S. Patent Application 20120185399 of Draper published Jul. 19, 2012 discloses a method for notifying consumers of vehicle recall notices. One embodiment is passive since the recall notice is generated only if the consumer brings the vehicle to a service center. This dependency means that if a consumer does not bring the vehicle to a station with a networked computer the recall will not be notified to them.

U.S. Pat. No. 8,145,574 of Hancock et al. (2012) although describing a system to generate, track and verify product recalls it does not address how a consumer can get the refund, replacement or fix for the defective product from the manufacturer or supplier using the system. Consumers are notified of the recall but need to navigate through the suppliers or manufactures site to negotiate for a refund without a central point of contact.

U.S. Patent Application 20090144104 (Claire Marie Johnson inventor) published Jun. 4, 2009 describes a system and method that doesn't connect the product manufacturer to the consumer. So although the consumer is notified of the recall, they are not enabled to take the necessary action to get the refund, fix or replacement. This invention relied on the consumer's manually registering the product they own. The system has no automated tools to import purchases this creates a need to make a matching criteria because of possible errors.

U.S. Pat. No. 8,600,827, issued Dec. 3, 2013 to Edward W. Fordyce, III, and Nurtekin Savas, describes of a platform for product recalls that allows the querying of a database of recalled products and matching user's products to recalls based on preselected product identifiers. The PR (Product Recall) platform generates messages to users that their product is recalled but the solution relied for the supplier or manufacturer to be registered on the platform. This solution also relies on the consumer having purchased the product from the merchant and having an account on the manufacturer or supplier's systems. The PR Platform does not provide reporting or analytics for consumers to track their claims or a way to get their refund directly. This solution doesn't contain ecommerce integration tools for consumers who want to purchase from sites not registered on the platform.

Objects and Advantages

Accordingly, besides the advantages and objects of the unified notification and analysis platform in my above patent, several objects and advantages of the invention are:

It is an object of the present invention to provide a method and a system for unified product recall information and analytics across the globe. It is an object for the present invention to provide an easy way for a customer to check product recall status by scanning the primary set of unique product identifiers such as Global Trade Item Numbers (GTINs), which include UPC, EAN (in Europe), JAN (in Japan), and ISBN. In addition, a Manufacturer Part Number (MPN) can be used to identify a specific product in the MPN data element if it is accompanied by the manufacturer's brand name in the 'brand' data element.

It is an object of the present invention to show product recall status for system generated product's documents or files such as: quotes, invoices, contracts, reports . . . etc. It is an object of the present invention to directly notify and report to a vehicle owner with any recall notices of a vehicle. The customer can then contact the manufacture or dealer to take necessary action since it is not safe to drive a recalled vehicle. It is an object of this invention to provide reports, notifications, and analytics for enterprise software which contains product information.

These and other objects of the invention will be apparent to those skilled in the art from the description that follows.

SUMMARY

The method and the system of this invention centers around the innovative process of collecting incomplete or inconsistent data from different data sources that are publicly available and in different formats and applies methods for determining consistency and cleaning up of the data to be stored in a searchable format. The system automatically seeks missing data from product recall notices and uses that recovered data to notify system users and facilitate communication between customers and suppliers in order to promptly resolve claims.

The data sources for all products recalls are publicly available from different government agencies and/or manufacturers in different formats. The platform is capable of loading all product recalls from different Application Programmable Interfaces (API), RSS feeds, spreadsheets, files, and other data formats and extracting all needed data elements along with metadata elements and stores the data in a relational Database Management System (RDBMS).

The platform is capable of identifying product information from the product recall notice and in cases of inconsistency or incompleteness the platform looks up the missing information from other web sites that contains missing data elements and store it in the platform's RDBMS. The platform provides a full text search for all extracted data elements providing a world-class search experience and in addition adds semantic search features to provide relevancy information for all searchable content. The platform has notification channels such as: Email, SMS and other notifications methods to notify customers with product recalls. The platform is integrated with enterprise systems or software to provide instant and on demand product recall status for any product display form or any product's record that is showing detailed product information. The platform contains different applications such as: Mobile applications, Tablet applications, services, Add-ons, widgets, APIs, extensions for existing systems.

The present invention reduces the cost for handling product recalls for enterprises and other business benefits by: protecting business reputations, increasing future sales with minimal operating and maintenance costs, minimal inventory losses and greatly reducing environmental impact. Also, it provides customers including consumers with the information they need at or after the time of purchase through different notification means as described in this document.

As will be appreciated from the discussion which follows, the system automatically collects data from various data sources that are available in different formats. The recall data collected from government sources and/or manufacturers are typically insufficient and requires important missing data elements to enable efficient recall processing. The inventive system automatically collects missing data elements and brings more of the recalled product's data elements from other external sources to have a more complete product information for a recalled product. Therefore, the system operates to generate a more complete product profile for any recalled product. The data is converted from unstructured data or semi structured data to a common structured data format so that the information can be processed and compared with other data, for example, stored customer data which is also stored in the common format.

By comparing recalled product information to customer product information, automatic notifications can be generated and provided to customers. That is, for every registered customer who owns or has shown an interest in a product that has been recently recalled, the system notifies the customer through the notification services in our platform showing that one of the products has been recalled and instructs the customer to contact the manufacturer through a resolution center.

The system thus automatically identifies target customers for any new recalls through stored product information that customers have already stored in the products center. The system provides a customer an opportunity to take a fast action by allowing them to contact product's manufacturer through the resolution center and take the appropriate recall action to replace, fix or refund a recalled item.

DRAWINGS—FIGURES

A clear understanding of the salient features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating. Accordingly:

FIG. 9 is a screenshot illustrating a notification to a customer spontaneously sent to a customer having a recalled product in their customer product ownership profile. A similar notification is sent to the supplier;

FIG. 10 is a wireframe diagram of a screenshot of a notification spontaneously provided to a system user having 3 sections: an upper section showing products recently imported into the user's product profile; a middle section indicating recently recalled products in the user's product profile and a lower section showing updates to resolution center activity concerning the user;

FIG. 11 is a wireframe diagram of screenshot of entries in the product center for a user;

FIG. 15 is a wireframe diagram of screenshot of the status of claims a supplier user or a customer user views to determine the status of claims submitted in the resolution center.

DETAILED DESCRIPTION—PREFERRED EMBODIMENT

Figure 1:
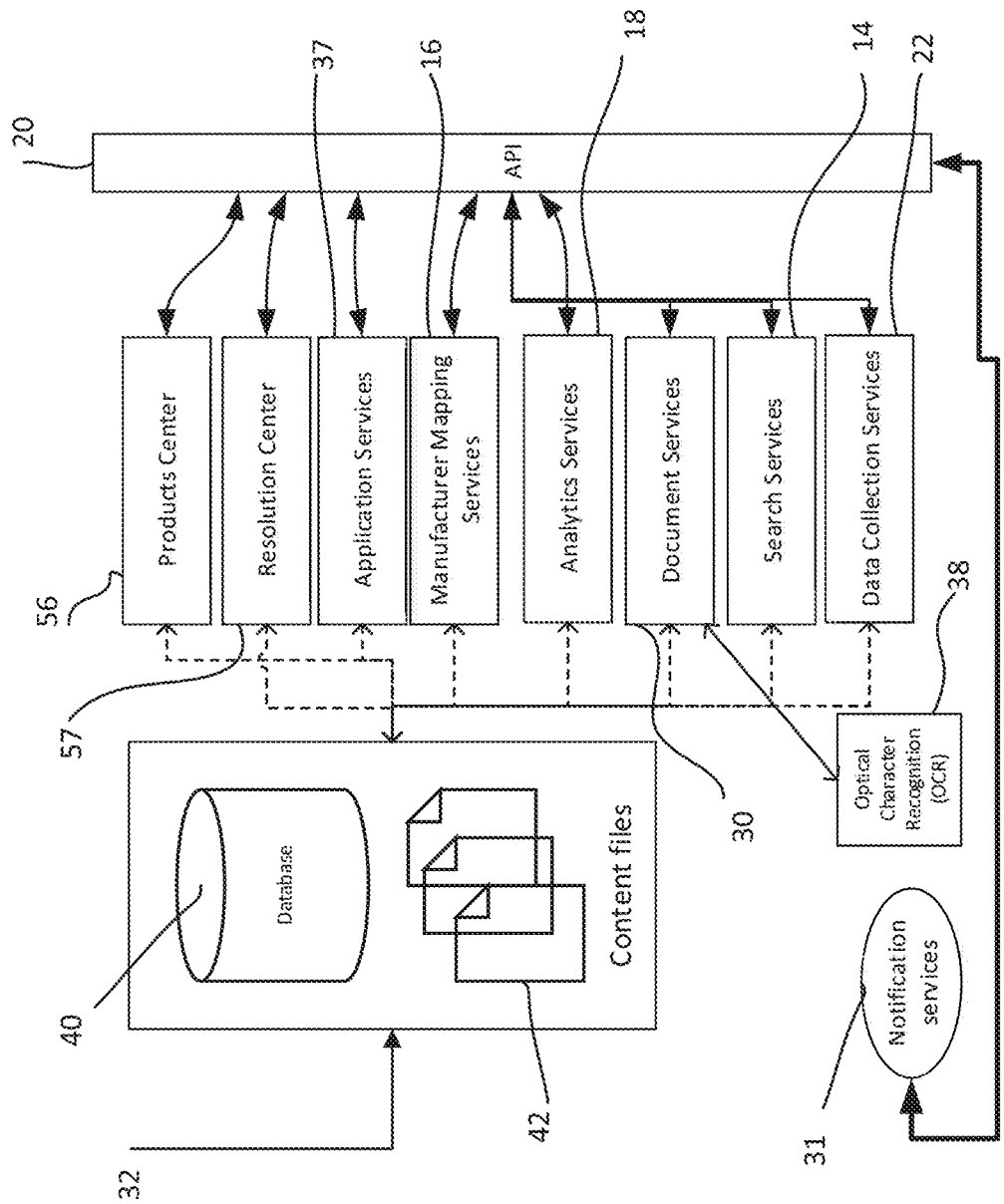
FIG. 1 is a schematic diagram of a preferred embodiment of the method and system of the product recall analytics and notification platform which consists of a set of services to achieve this invention's goal of providing immediate access of product recall information.

The invention is described in detail below in connection with the Figures for purposes of illustration, only. The invention is defined in the appended claims. Terminology used herein is given its ordinary meaning consistent with the exemplary definitions set forth immediately below.

"eCommerce services" and like terminology refers to suppliers' or other commercial websites containing product information such as the website of a manufacturer or retailer including product codes, product identification numbers, prices of products, manufacturing dates and lot numbers or like information.

A "computer implemented system" and like terminology refers to the fact that the software modules and databases of the invention system reside in appropriate computer hardware such as microprocessors, servers, computer memory, hard drives, flash drives or other appropriate hardware and that the system is thus operable to perform the recited functions.

A "customer" means and includes recipients of products from a supplier such as consumers, retailers, distributors, dealers, wholesalers and the like.

"Direct computer messaging" may be provided by way of a link provided to a user, optionally in the form of an icon or by way of direct computer action between the parties.

An "IoT" device is a piece of hardware with a sensor that transmits data from one place to another over the Internet. Types of IoT devices include wireless sensors, software, actuators, and computer devices. They can be imbedded into mobile devices, industrial equipment, environmental sensors, medical devices, and more. Consumer connected IoT devices include smart TVs, smart speakers, toys, wearables and smart appliances; examples of industrial and enterprise IoT devices include smart meters, commercial security systems and smart city technologies—such as those used to monitor traffic and weather conditions.

A "link" refers to an automated tool for sending a communication to a system user or an entity not registered on the system. Typically a link is implemented with a screen icon.

"Manufacturer's identification numbers or identifiers" and like terminology may include serial numbers, series codes and the like in addition to model numbers issued by a manufacturer.

"Offline data sources" and like terminology includes digital devices not available to the internet, including computers, memory devices and the like as well as printed material including text or images.

"Other dates associated with the product" may include best by dates, manufacturing or shipping dates, maintenance dates, recall windows and so forth.

"Recalled products" refers to products as to which a government agency or a supplier has issued a recall notice.

"Semi structured data" includes data from sources that may have some structure along with unstructured data such as text, for example, xml or json sources which include unstructured data.

"Spontaneously" means an action taken automatically by the self-implementing computer system without prompting by an administrator.

"Supplier" refers to a manufacturer, dealer, distributor or retailer who supplies products.

System "User" means a supplier or customer who is registered on the system of the invention.

FIGS. 1-5, 7, 8

FIG. 1 is a schematic diagram of a preferred overall embodiment of the method and system of the product recall analytics and notification platform which consists of an application programmable interface (API) 20, a plurality of software modules including data collection services 22, manufacturer mapping services 16, search services 14, analytics services 18, document services 30, repository 32, notification services 31, an optical character recognition (OCR) service 38, a products center 56, application services 37, and a resolution center 57. The API 20 is connected to manufacturer mapping services 16. Analytics services 18 are connected to the repository 32. Document services 30 processes documents that contain product information connected to the repository 32. Search services 14 are connected to data repository 32. Data collection services 22 are connected to repository 32. OCR 38 is also connected to data repository 32. Notification services 31 connect to API 20. Products center module 56 and resolution center module 57 also communicate with each other, applications services 37, manufacturer mapping services 16, API 20 and repository 32. Moreover, the various components are also configured to communicate with each other as indicated by the arrows on FIG. 1. This platform stores all product recall information in repository 32 which is comprised of a database 40, content files 42 and conventional types of storage that is required for delivering this invention services (not shown).

Manufacturing mapping services 16 is a mapping software component that stores manufacturer's information and the linkage to every recalled item profile.

Analytics Services 18 is a software component that builds trained and predictive models for recalled items that is related to every recalled item, manufacturer, country, product types, remedy types, and personalized analytics reports.

Document Services 30 is a software component that identifies documents in the system by extracting the required content for a recalled item. This works with scanned documents, images and any unstructured content files for a recalled item.

Search Services 14 is a software component that builds and indexes all content for recalled items and makes it easy to search by any data or metadata elements of a product.

Data Collection Services 22 collects and cleans up the captured data elements from various resources in an easy way to be searchable and presented in the system.

Optical Character Recognition (OCR) 38 is a software module that works with data collection services to extract text content from various file formats and store that for a recall or product item in the system.

Notification Services 31 is a software component that pushes notifications to platform users through the platform for published recalled items on timely manner.

Application programmable Interface (API) 20 is a software component in our platform that deliver all our data to our applications in the web, mobile or other software application types.

Content files 42 contains files, images, videos . . . etc. or any related product storage files that is delivered through the system.

The various components are described further in the description which follows.

Figure 2:
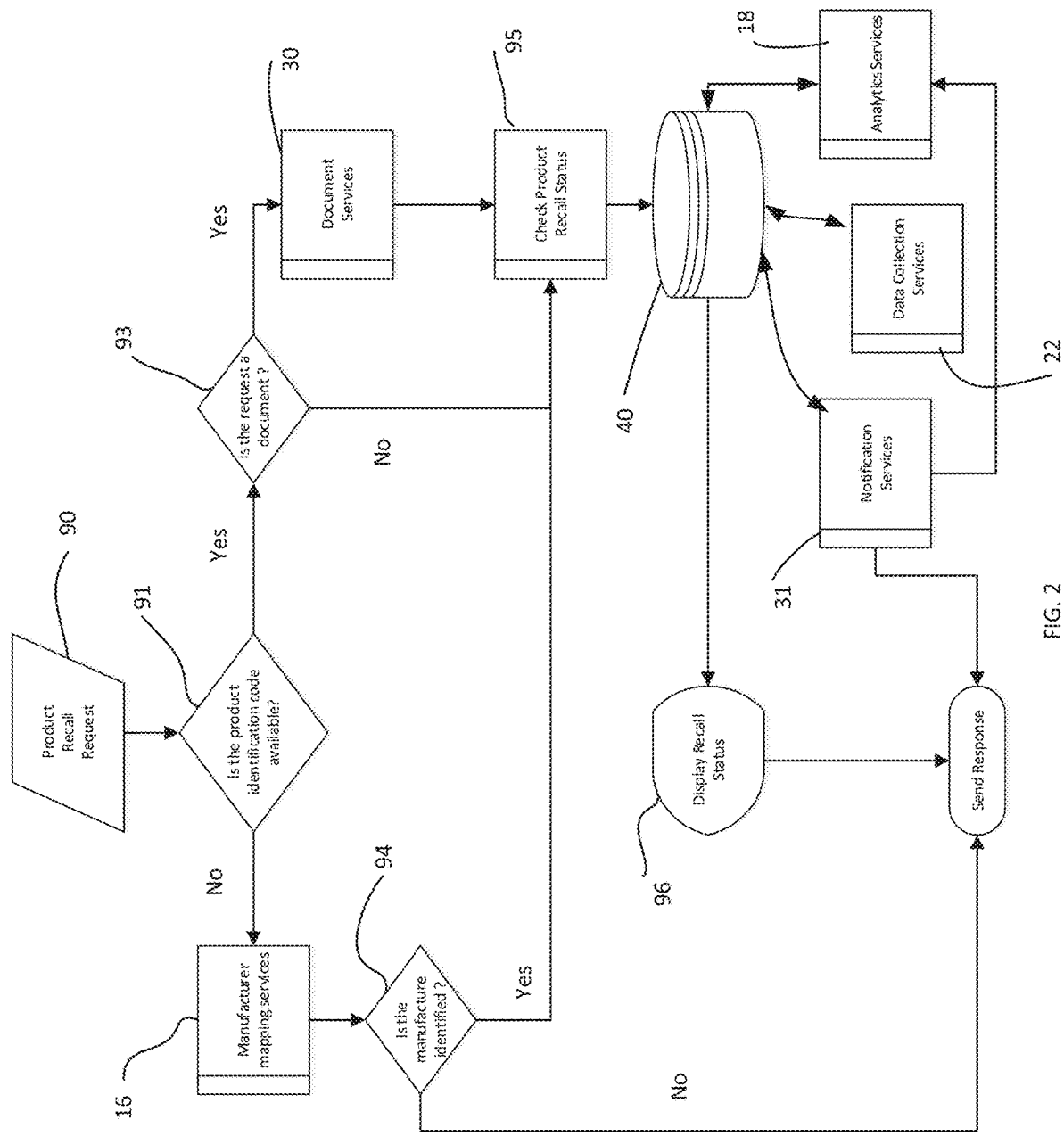
FIG. 2 is an illustration of the method and system of this invention showing a simplified flowchart of the method of handling product recall status checking requests.

FIG. 2 is an illustration of the method and system of this invention showing a simplified flowchart of the method of handling product recall status checking requests. The system receives a product recall checking request 90. The system identifies the manufacturers of this product 91. If the manufacturer is identified, the system checks if the request is a document 93. If the request is a document, the system transfers this request to document services 30. If the request is not a document for an identified manufacturer, the system checks the product status 95. The product status service checks against the database 40. The system prompts the status of the product 96. Data collection services 22 checks the database 40 for all stored documents for recalled items. Analytics services 18 reads all data elements from the system database 40. Notification services 31 reads all recalled items and notifies all target customers.

The system captures and stores various product identification codes such as: UPC, GDIN, EAN, ASIN and SKU into the product profile. When the data collection services capture real-time recall notices published by any federal agency, it triggers the application services module. Application services module 37 looks at products centers for system users and identifies target users for a recall based on one the product identification codes. Then, the application services trigger the notifications services module to notify the target users with the recall notice details and the required action. A customer receives the notification by email, or on the phone and he will be able to look at notification message and start contacting the manufacturer using the resolution center. Upon a submission of a claim by the customer, the manufacturer will be notified at the same time to start the conversation with the customer and find a resolution for his claim by taking the right remedy action.

Figure 3:
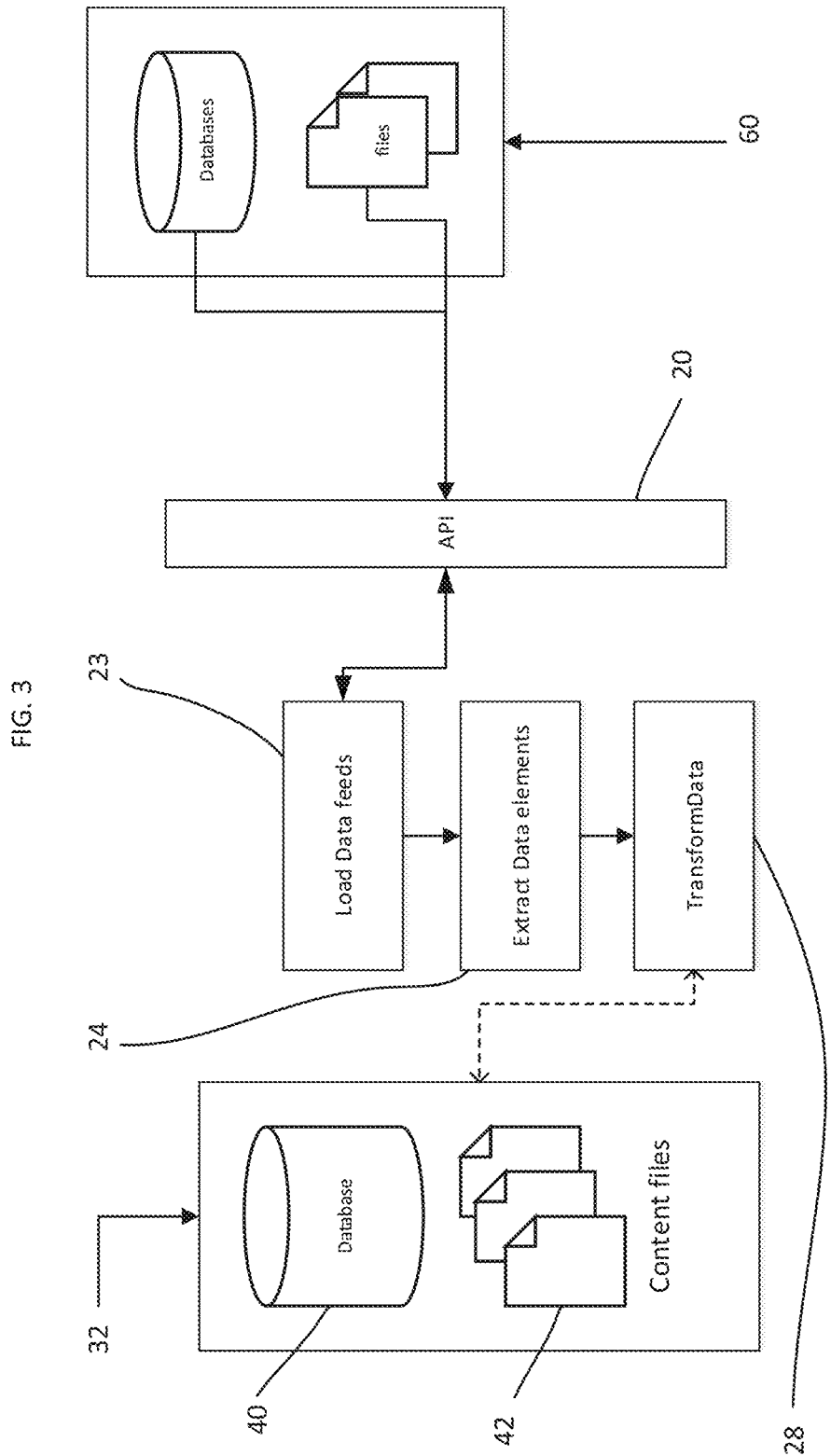
FIG. 3 is a schematic diagram of a preferred embodiment of the method the platform data collection services which connect to all product recalls data sources and then translate all captured data into a designed data elements structure to provide the best detailed search experience.

FIG. 3 is a schematic diagram of a preferred embodiment of the method the platform data collection services which load data feeds 23 from all product recalls data sources through API 20 and then extract component 24 extracts all captured data elements and transform it at 28 into a designed data elements structure to provide the best detailed search experience. The data collections are connecting, extracting all available resources on timely manner and collect published products recalls notices. Then, those services are cleaning up all captured data, and create metadata elements and detect any data inconsistency and correct them before storing it in the repository 32. The data collection services are connecting to other external sources of data 60 or utilize producer's data in the platform data to complete the product missing data elements.

Figure 4:
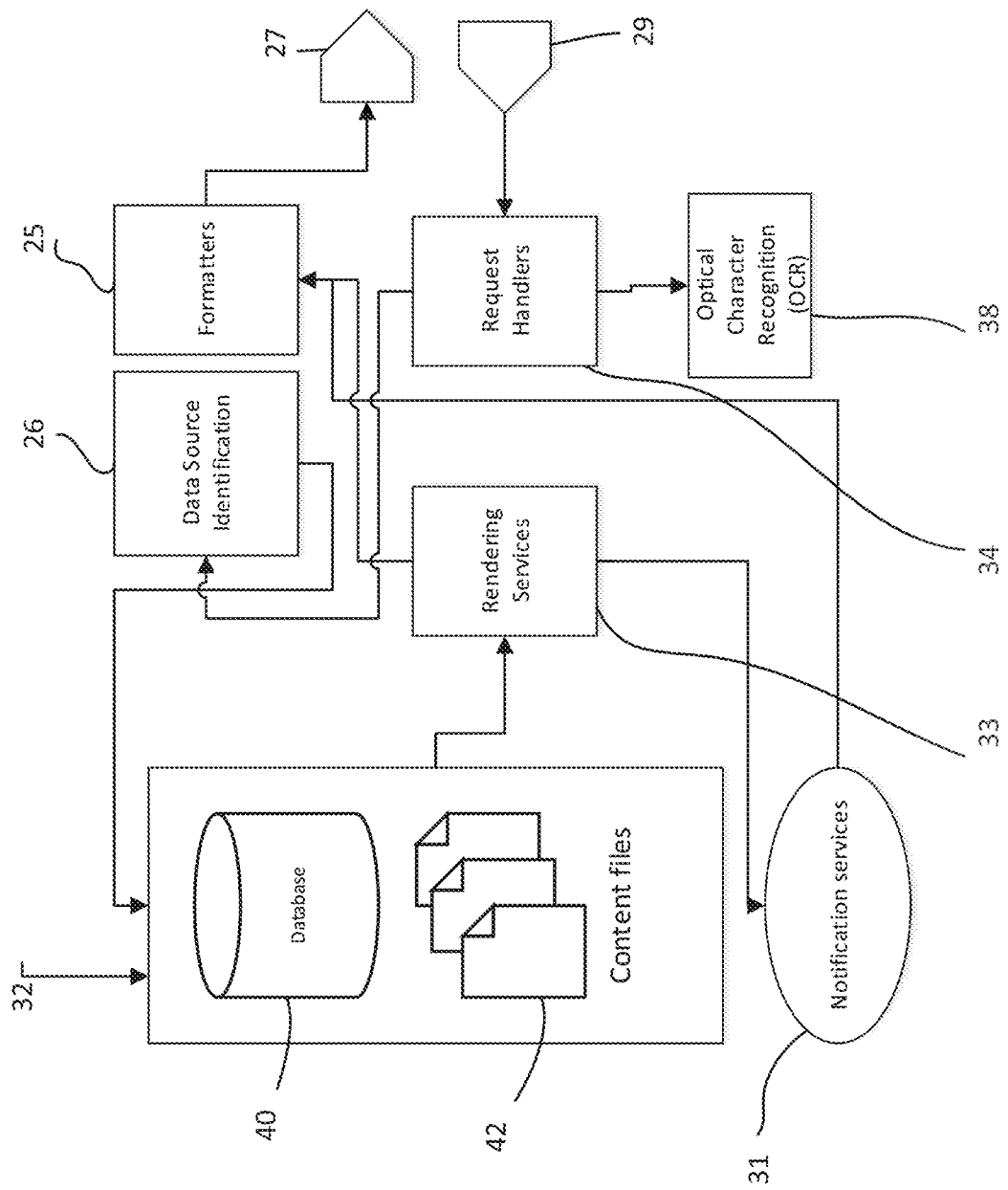
FIG. 4 depicts the platform API that is used to provide all captured and processed intelligence to other applications such as handheld applications, web or other systems.

FIG. 4 depicts the detailed architecture components of the platform API 20 that is used to provide all captured and processed intelligence to other applications of the invention such as handheld applications, web or other systems. API 20 accepts requests 29 through request handler 34. The request handlers send document requests to OCR 38. Extracted request information is routed to data source identification 26. The data source identification 26 stores all product information in the repository 32. Rendering services 33 read product recall information and it send it to formatters 25 before sending out all responses to the caller. The formatted output 27 is the final output to be sent to the application or the device.

Figure 5:
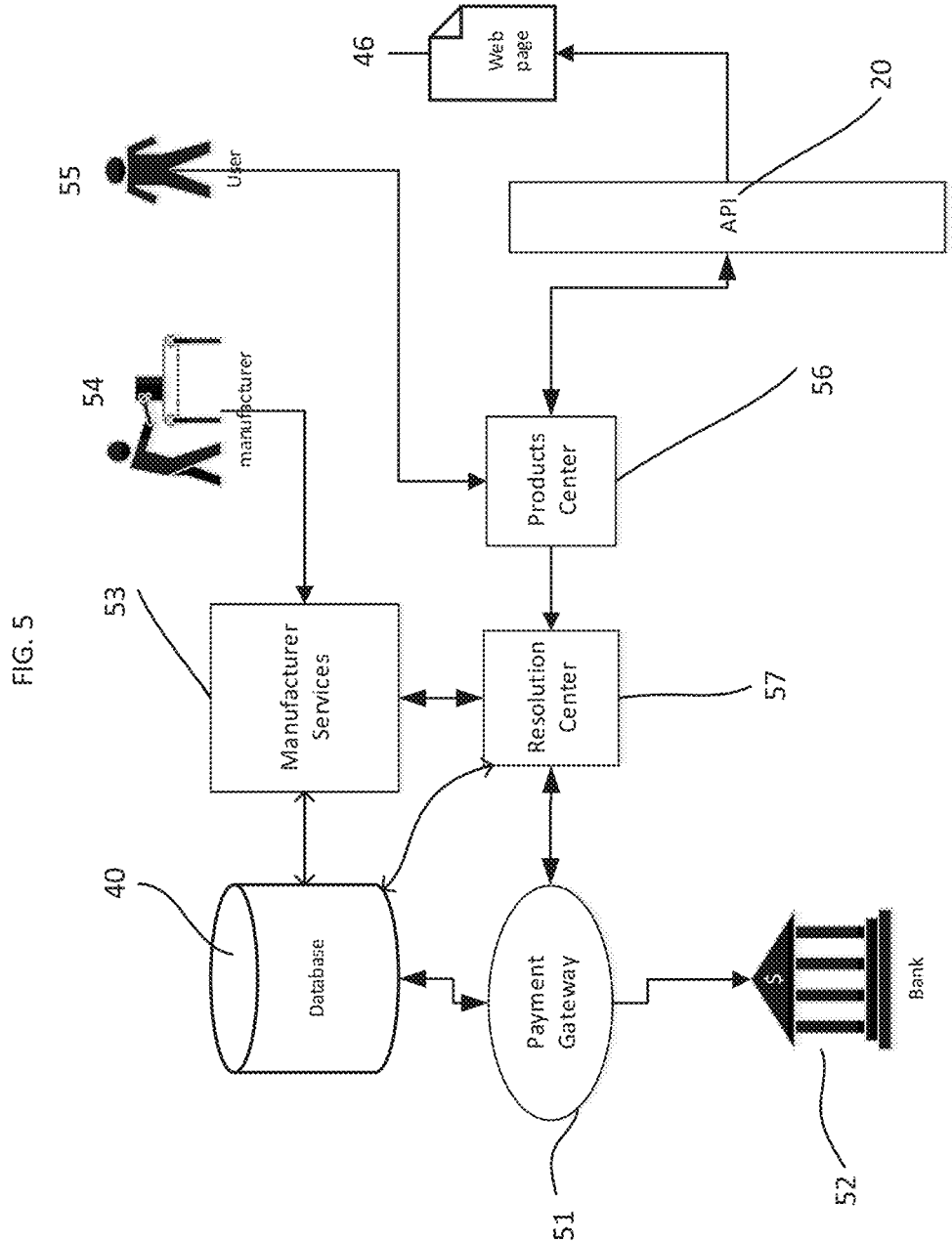
FIG. 5 depicts the platform integrating with eCommece, seller websites and web applications by providing a flag if a displayed product is recalled or not and available while shopping for products in any eCommerce website.

FIG. 5 depicts the e-commerce application embodiment to handle user's claims in the resolution center 57 for products in the products center 56 where users store all their assets. Manufacturers manage all their inventory and platform services in the manufacturer services 53. Manufacturer services 53 retrieve data from the database 40. Resolved claims by the manufacturer settle its payment to the customers through the payment gateway 51. Payment gateway transfers the amount of money to the user's bank account 52.

Figure 7:
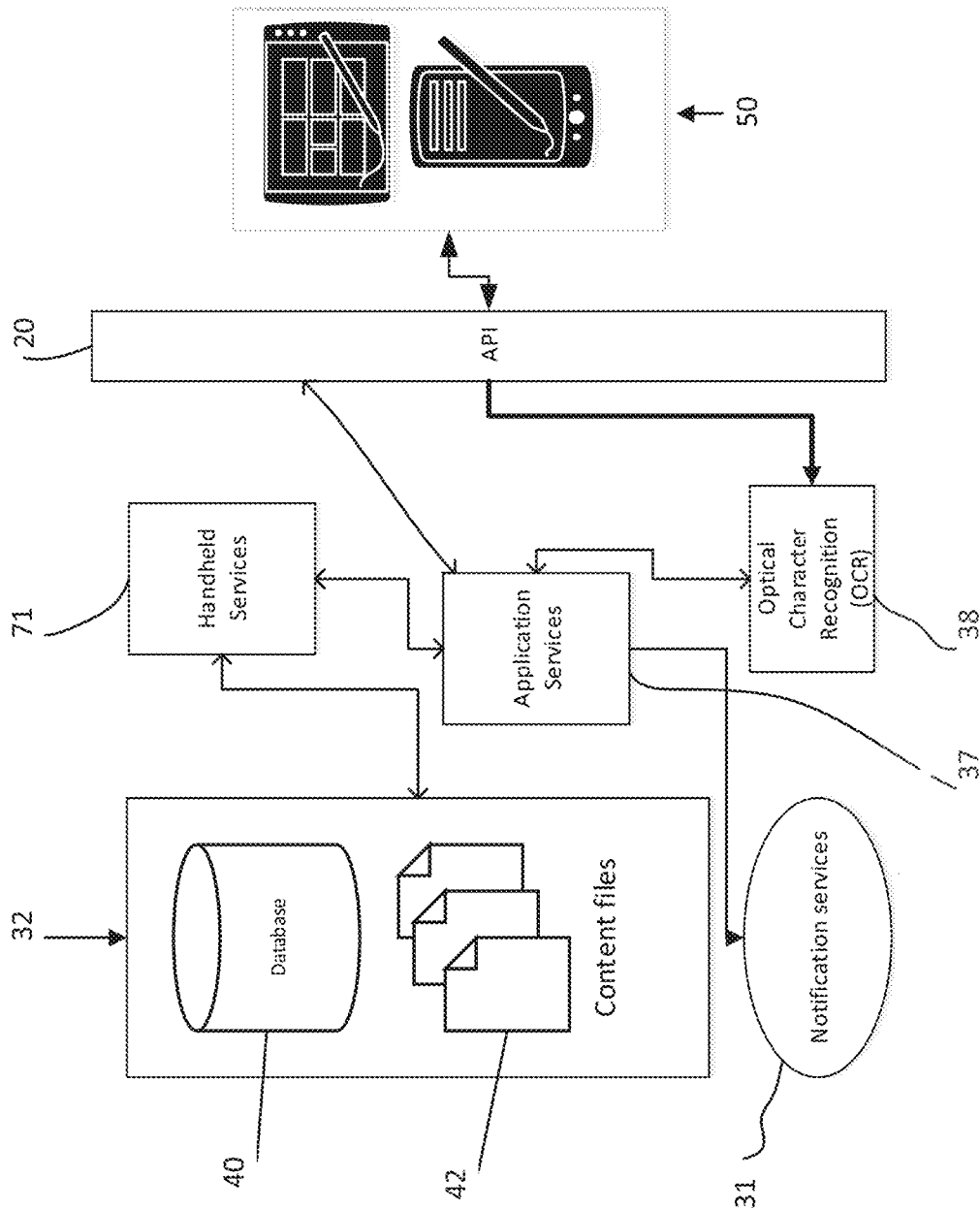
FIG. 7 depicts the handheld application embodiment to detect recalled products with the product barcode or product identification code.

FIG. 7 depicts the handheld application embodiment to detect recalled products with the product barcode. The handheld applications such as: mobile, tablet or electronic wearable devices or any electronic device with barcode reader to check a product's recall by the product barcode. Devices such as mobile, tablet 50 query products recall status through the API 20. The API transfers all the requests to the application services 37. The application services transfer request information to handheld services 71 that query the repository 32. The notification services 31 pushes notifications as needed. OCR 38 receives documents from application services.

Figure 8:
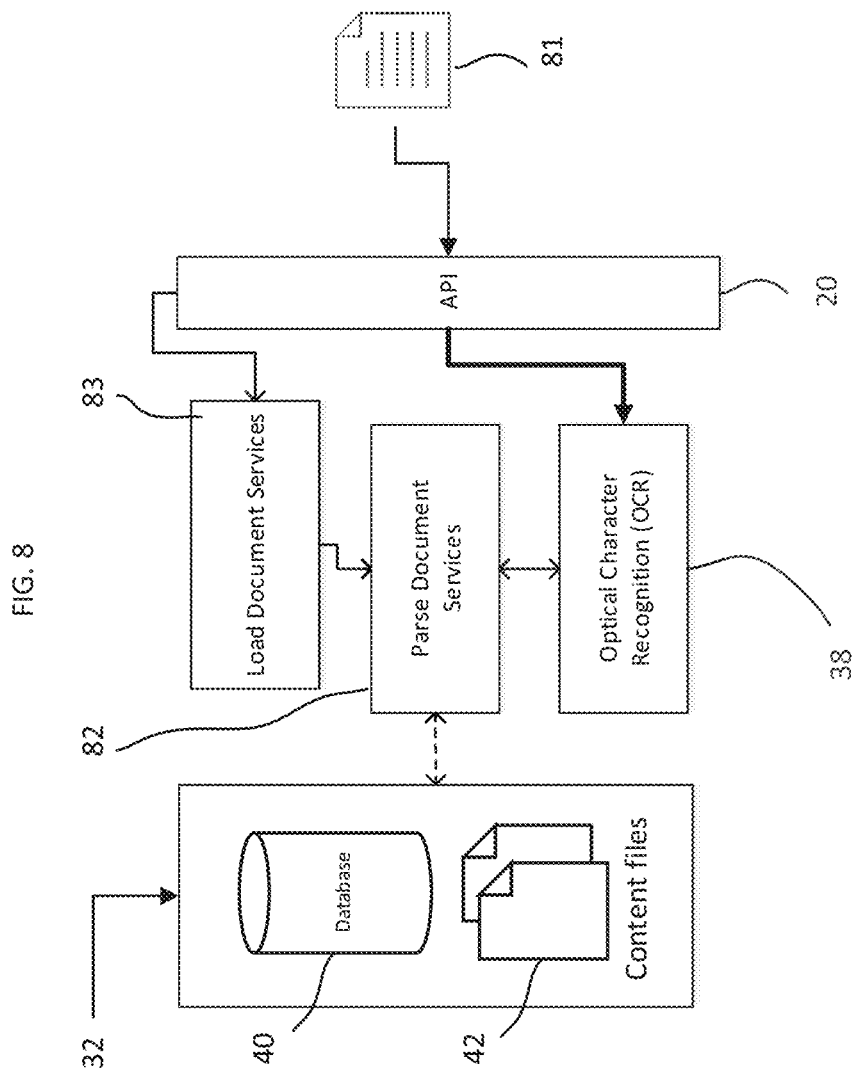
FIG. 8 depicts the document services embodiment to extract product barcode or product identification code from a document and check against the platform API to detect a product recall status.

FIG. 8 depicts the service embodiment to extract product barcode or product identification code from a document and check against the platform API to detect a product recall status. This service uses an optical character recognition (OCR) 38 that received requests from the API 20. Load document services 83 receive recall requests from the API. Parse document services 82 reads the loaded files and parse it. Parse document services 82 store the extracted information in the repository 32.

Operation—Preferred Embodiment—FIGS. 1-5, 7, 8

The API 20 is the entry point for this invention for all product recalls inquiries from a user. The API is connected to manufacturer mapping services 16 which is responsible for mapping seller internal product identification number such as SKU to the universal product identification code. Service 16 is used when the request doesn't contain the Universal Product Code and it provides mapping for each seller inventory identification code. Analytics services 18 creates all analytics and reporting in the system. Document services 30 processes documents that contain product information. Search services 14 crawl, gather and index all captured content in the invention storage to provide an enterprise class search experience. Data collection services 22 are responsible to load, extract and process all recall products information from different sources into this invention. Optical Character Recognition service 38 that works in conjunction with document services 30 to analyze document in non-text format such as images. Notification services 31 deliver all types of notifications for customers, users and devices of this invention. This platform stores all product recall information in the repository 32

FIG. 2 shows a simplified flowchart of the method of handling product recall status checking requests. This invention handles all requests through step 20 which is handled through its API. The system checks if the request contains a product identification code through step 91. When the identification code is available the system checks if the request is a document as illustrated in step 93. If a request is a document then the system transfers the request to document services as illustrated in step 30 to extract the product identification code from the document. When the document identification code is present, the system checks the product recall status as illustrated in step 95. The system checks the status against the storage databases and files in the system as illustrated. When the product identification code is not available, the system checks against the manufacturer mapping services as shown in step 16. The system also checks if the manufacturer is identified as shown in step 94 and therefore the system can check the recall status through the manufacture code. The analytics services are examining all stored information as indicated at 18 and communicating with the other components as shown. Data collection services 22 store all captured data in the database 40 and content files 42. Notification services 31 sends notification based on the analytics and reporting services. The recall status display 96 is showing the recall status with a linkage to the actual legal notice in case of a product is recalled.

FIG. 3 is a schematic diagram of a preferred embodiment of the data collection services. The data collection services read all content sources through the API 20. External systems or sources contain recall information as in 60. The API 20 reads the data files or sources and load these data feeds as in 23 for processing. Extract data elements component 24 read the loaded files and extract all data elements needed for the platform. Transform data component 28 transforms all processed data into the platform format. All processed data is stored in the platform repository 32.

In operation, the system spontaneously communicates with all target government agencies and/or manufacturers to obtain their recall notices. The URL addresses for recalls issued by the agencies are on a stored list in repository 32. The system identifies the last recall issued by the agency and/or manufacturers stored in repository 32 and looks for later recalls by the agency and/or manufacturers, that is, the system detects whether or not there are any new recalls that have been issued after the last time the system downloaded recent recalls. This is accomplished by comparing recent recall notices issued by the agency by number or date to those already stored in the repository. When new data is present at the agency, the system downloads the new information, transforms the data to the platform format and stores the formatted data in the repository as discussed further below.

The information extracted from the government agency and/or manufacturers recall notice includes typically one or more of product information, reseller information, manufacturer and contact information in plain text. Data in plain text is hard to read, search, supplement and provide information and notifications to suppliers, customers, retailers and the like in an efficient manner. Data collection services employ recognition algorithms with pattern recognition specific to the agency and/or product in order to identify the type of the recall and based on this characterization, the algorithms identify and extract and group relevant data elements together such as: product information, reseller or manufacturer information to be organized and stored in the one or more databases of the system. The pattern recognition algorithms use keywords or keyterms used by the agency adjacent recall numbers, manufacturer information, product unit information and so forth in order to characterize the data in the first instance. Since the recall data is usually downloaded as plain text or other unstructured or semi-structured format, the system may not know the specific position of the required data in the downloaded text, or the page may not be formatted in such a way that the data can be easily parsed. In such cases, the system may employ regular expressions (regex or regexp) to match the content on a page to a specific pattern, such as product code, type of product, manufacturer numbers and so forth so that the data can be characterized and stored in structured format.

The extracted data elements are transformed to the platform data format, preferably a structured text tabular format having entries for a variety of data elements not necessarily present in the recall notice, referred to herein as a template. The data extracted from the recall notice is stored in database 40 in structured text tabular format and blank entries in the template identify missing information relating to the recall and the system automatically seeks those missing elements. That is, when data elements present in the template are missing from the recall notice, the system seeks alternate sources to find additional data elements for inclusion into the recall product record such as price data, supplier contact data and so forth. The additional data is also frequently in plain text and hard to find which is an important benefit of using the automated system of the invention.

Once missing information in a recall notice is identified, supplemental information about the recall and/or the recalled product is automatically sought from locations other than the original agency recall site by the application services algorithms. Alternate location addresses are stored in repository 32. The algorithm selects alternate sources to search based on manufacturer information, product information or other identifying information in the downloaded and formatted recall notice information. This is accomplished, for example, by selecting a manufacturer from look-up tables of manufacturer's websites and communicating with an e-commerce website of that manufacturer (or other sites indicated in the look up table) which may have the missing information and procure additional data elements for a recalled product supplied by that particular manufacturer.

The supplemental information captured is then processed in the same manner as the information downloaded in connection with the agency recall notice issued and added to database 40 in the structured data format of the platform. The combined information about particular recalled products in database 40 is then used to issue notifications, provide reports, update product profiles, resolve claims and so forth, as described herein.

FIG. 4 depicts the detailed architecture components of the platform. The entry point of the API 20 directs all product recall inquiries to request handler components 34. The handler detects if a request is a non-text file such as an image then it transfers it to an OCR 38 to extract the content of the image. When the request is not a non-text file format it transfer the content of the request to data source identification 26 that is responsible to find the source of this request and then lookup the product recall information from the repository 32. The repository returns the request to lookup the product recall with a response to the rendering services 33 that encapsulate all the results before sending it to the formatters' component 24 which format the response to best format based on the caller preferred response format. When a response requires a notification to be sent, the rendering services send the response to the notifications services 31 (FIG. 1) and then the output of the notification services is being sent to the formatters' components before send it back to the caller. The final response output is sent through an API output entry point.

FIG. 5 shows the platform integrating with eCommerce, seller websites and web applications. The platform integrates with eCommerce websites, available while you surfing for products on any eCommerce website. The platform integration to eCommerce sites is through providing a widget to flag or mark if a displayed product is recalled or not. Once the platform widget is configured in the eCommerce site the widget shows if a product is recalled or not to the customer. This increases seller credibility and trust. The integration also can hide or not show any recalled products in the eCommerce sites. The following actions describe how it works. A product page in a site is displays a product and the platform widget calls the API 20 to check if a product is recalled or not based on product identification code. The platform users stored all products their own in the products center 56. The manufacturers manage all their inventory and platform business services through the manufacturer services 53. The resolution center 57 receives all user claims for recalled items and notifies the manufacturers with user's claims. Once the manufacturer mark a claim as resolve, the platform will send the amount of the recalled item to the payment gateway 51 which settles the payment into the user's bank account 52.

FIG. 7 depicts the handheld application embodiment. The handheld applications include: mobile, tablet or electronic wearable devices or any electronic device with barcode reader to check a product's recall by the product barcode. A user scans any product barcode and the handheld device connects to the platform API using the product identification code to provide if a product is recalled or not, in case of a recalled product more detailed information is displayed with a link to the official recall notice.

The operation is as follows. A user scans a product by scanning a product's barcode, SKU or any reseller's identification code. The platform is displaying if a product is recalled or not based on the following mapping fields in the platform handheld services 71 such as: on a UPC, EAP, JAN, ISBN, GTIN, MPN, SKU or any product identification code data elements. Then recalled products notifications are sent to the handheld application users. The Handheld application users run reports for all scanned products with the recall status is showing in the report based on the product identification code data elements. When the product identification code is not present, the application services 37 sends all requests to manufacturer mapping services 16 in FIG. 1 to lookup a product by the manufacture product code or SKU. Once the product is identified, the request is transferred to the handheld services 71 to lookup the recall status of product. The Handheld services looks up product against the repository 32. The Handheld application is showing a mark or a text as configured if a product is recalled or not. The Handheld application shows a product recall status with a link for the legal notice. The Handheld application contains a link to the platform to detailed information for the recall legal notice. The notification services 31 then send notification for all customers or users who bought or interested to buy a recalled product.

FIG. 8 shows the service embodiment to extract product barcode or product identification codes from a document and detect a product recall status. This service uses the OCR 38 component to extract product identification code from a barcode or product identification code images in a document. The service contains OCR 38 along with the platform API integration, the OCR component 38 loads document files 83, and then the document services parse the content of the document 82 extracts the product identification code from an image in a document and then lookup the identified product identification code against the repository 32 to check the product recall status. The service is used through the web or as a client application where the tool will find barcode images and provide a detailed recall status for all detected and validated barcode or product identification code images in this document. The service accepts any type of document formats or report types. The document 81 is passed through the API 20.

Figure 6:
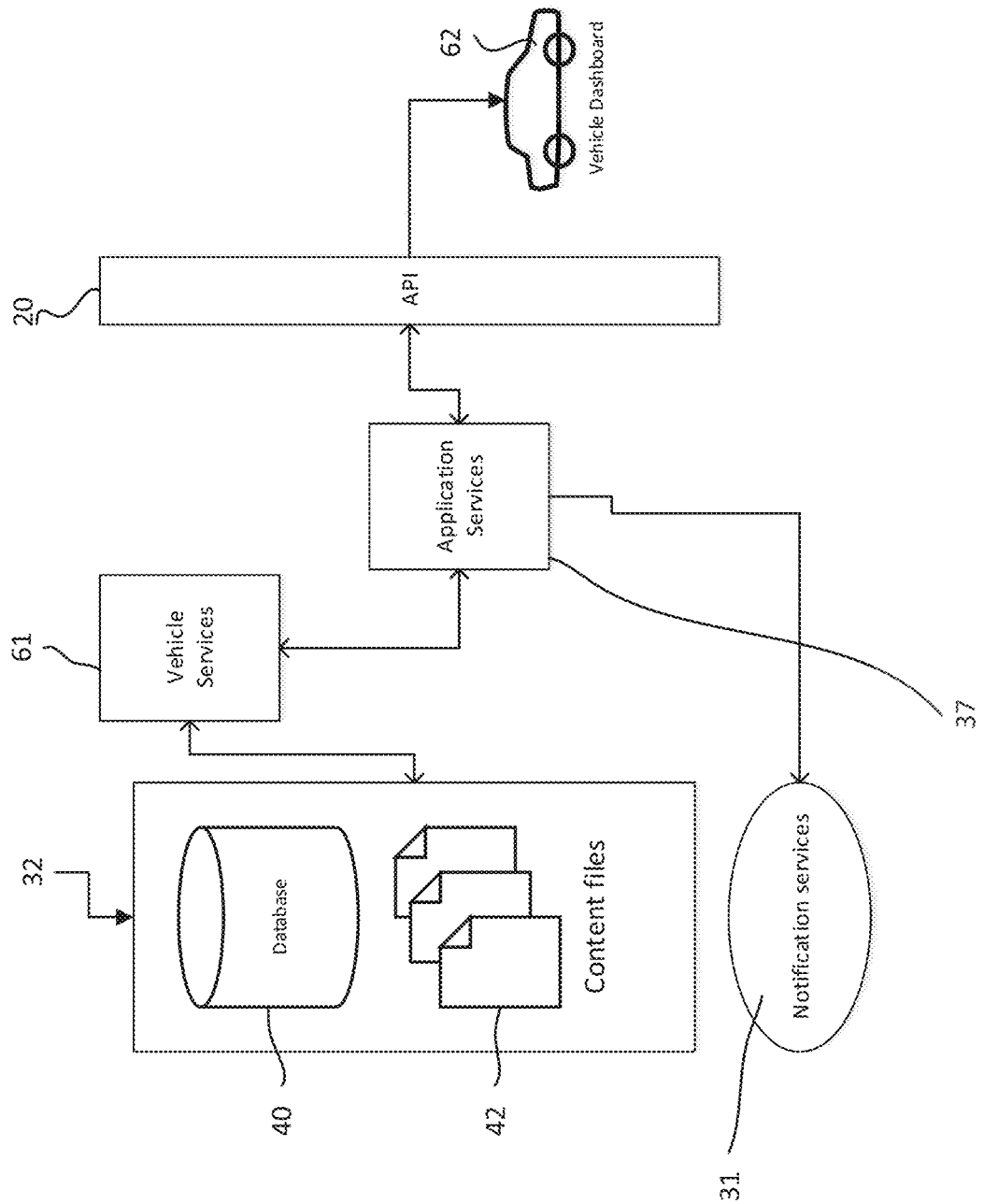
FIG. 6 depicts the platform integration with a Vehicle information system which is an integrated notification system that notifies vehicle's driver that a recall notice has been issued to his Vehicle.

Detailed Description—Alternative Embodiment—FIG. 6

FIG. 6 depicts the platform integration with Vehicle information system which is an integrated notification system that notifies the vehicle's driver that a recall notice has been issued for a vehicle. The platform has an application installed and operated from the vehicle dashboard. The application checks if a recall has been issued for the vehicle through the API 20. The application services 37 route all requests from the API to vehicle services 61. Notification services 31 provide any needed notification to the application services. Vehicle services store all information into the repository 32.

Operation—Alternative Embodiment—FIG. 6

FIG. 6 depicts the platform integration with Vehicle information. Once a recall notice is issued, the vehicle is not safe for the driver to drive and should be returned to the manufacturer or the dealer to correct any problems. A vehicle recall notice is issued for a vehicle make, model, year and production period. The vehicle services map the production period of vehicle make, model and year to a set of VIN numbers. These vehicle's VIN numbers are recalled and vehicle's owners should be contacted.

The Vehicle Recall Information System is state of art system to notify the driver in his vehicle through car's media or navigation System, or in the vehicle console so that a driver is able to get notified that a recall has been issued for his vehicle and also specify what part has been recalled. The platform pushes notifications for vehicle information system for all registered vehicles through the car make, model and year or by the Vehicle Identification Number (VIN). The operation is as follows. Vehicle Make, Model and Year or VIN number is used to push notifications to the vehicle digital information system. The platform through Vehicle Services 61 is able to recognize all vehicles' owners with the recalled vehicle make, model and year form the VIN number and sends notifications accordingly. Once a recall notice is captured in the platform through Application services 37, the notification channels are used to push notifications to vehicle digital information system. A Recall push notifications are sent to all cars' manufactures, dealers, vendors and sites through API 20. The notification services 31 send notification for all vehicles' owners who bought or interested to buy a recalled vehicle.

It will be appreciated from the foregoing that Data Collection Services capture & store various product data elements including product identification codes such as: UPC, GDIN, EAN, ASIN and SKU into the product center of each user. Users can scan product images or barcodes and the system store product data elements in the products center.

Additional service modules in the system may be further summarized and described as follows.

A products center is a centralized data repository for imported products by users in addition to any owned recalled products. Hence, a product could be added to the product center by scanning a barcode or an image of the product. The products center is the main repository for the application services to look at target users for any new recall notice. The application services keep matching recently published recall notices against the products center to identify targeted or affected users from a recall notice. For any targeted users, the application services trigger the notification services to contact the customers and manufacturers. Upon receiving the notification, a user or manufacturer can use the resolution center to handle all submitted claims by the affected users.

A resolution center is a messaging platform to help connecting customers to manufacturers and to have secure communication about a recalled item. The resolution center works hand in hand with notifications, document and data collection services components. A customer or a manufacturer receives the notification by email, or on the phone and then will be able to look at notification message and start contacting the other party using the resolution center. Upon a submission of a claim by the customer, the manufacturer will be notified at the same time to start the conversation with the customer and find a resolution for the claim by taking the appropriate remedial action.

Reporting and analytics services build models for recalled items, manufacturers and customers to help them easily identify potential targeted customers, estimated costs and intelligence reporting tools for platform users.

While the present platform has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the spirit of this invention.

The inventive system may be implemented on any suitable computer system using an open source framework, for example, and is implemented in a first embodiment as self-executing computer implemented system for product recall management utilizing internet communication comprising: (a) one or more databases storing: product recall information associated with recalled products; supplier information associated with a plurality of products, and customer ownership or purchase interest information associated with a plurality of products, said information being stored in a platform data structured format which associates the recall information, the supplier information and the customer ownership or purchase interest information with specific products and wherein supplier information associated with a plurality of particular products stored in the platform data structured format is referred to as a supplier product profile and customer ownership or purchase interest information associated with a plurality of products stored in the platform data structured format is referred to as a customer's product ownership profile; (b) a plurality of software modules residing in said computer implemented system operating as hereinafter provided; (c) an application programming interface communicating with (i) said one or more software modules, (ii) a plurality of external domains, and (iii) a plurality of customers and suppliers, wherein said plurality of software modules residing in said computer system spontaneously operate to: (iv) download recall information relating to recalled products from a plurality of government agency data sources over the internet in an unstructured data format; and (v) transform the recall information relating to recalled products received from government agency data sources in an unstructured format to said platform data structured format; and (vi) identify one or more additional data elements in a recalled product profile absent from the recall information received from government agency data sources associated with particular recalled products; and (vii) communicate with a plurality of eCommerce services and obtain one or more additional data elements in a recalled product profile absent from the recall information received from government agency data sources identified in step (vi) with respect to particular recalled products, the data elements thus obtained being referred to as supplemental product data elements; and (viii) supplement the recall information relating to particular products received from government agency data sources with supplemental product data elements obtained in step (vii) to provide combined recall information relating to particular products and save the combined product recall information in said platform data structured format in said one or more databases; and wherein further said plurality of software modules residing in said computer system spontaneously operate to perform at least one of (ix), (x) or (xi): (ix) compare combined recall information of step (viii) relating to products in the one or more databases with customer's product ownership profiles residing in said one or databases and upon a match between a product identified in the combined recall information relating to products and a product identified in the customer's product ownership profile, notify a customer that a particular product in its customer ownership product profile is a recalled product wherein the notification optionally includes at least one supplemental product data element automatically obtained in step (vii); or (x) compare the combined recall information of step (viii) with a supplier's product profile and customer product ownership profiles stored on said one or more databases and upon a match among a recalled product, a product identified in the supplier's product profile and a product identified in customer's product ownership profile, notify the supplier of a recalled product with identifying information as to customers with the recalled product in their product ownership profile; or (xi) both (ix) and (x).

Figure 10:
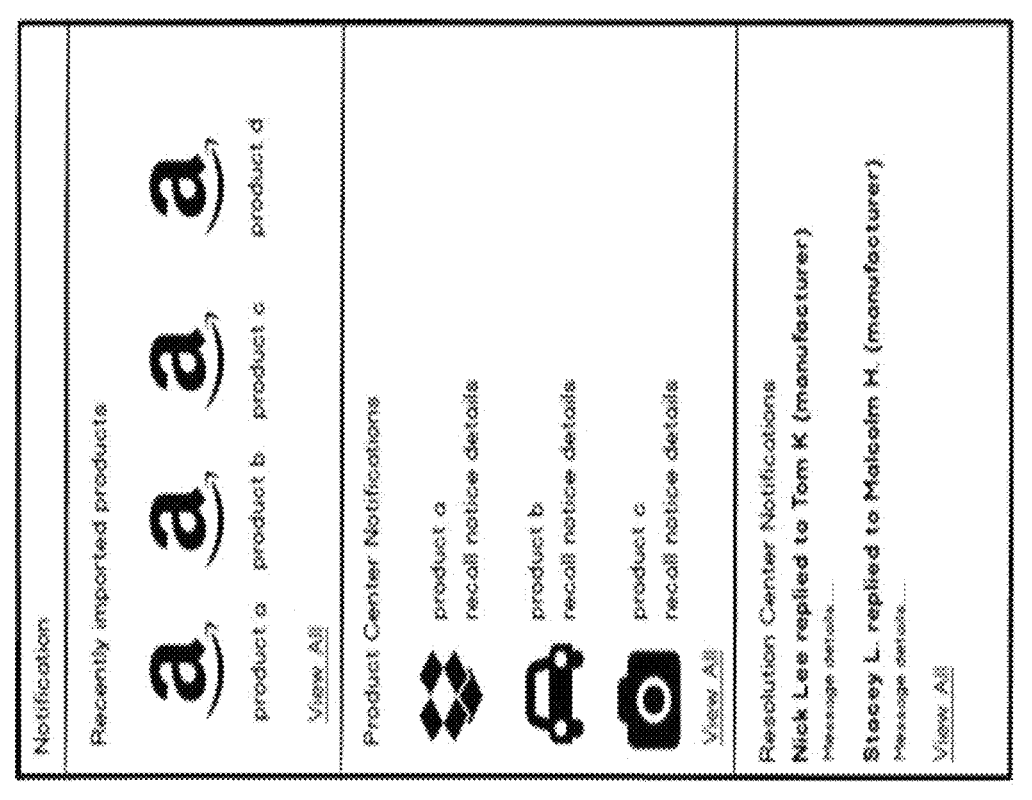

Examples of a notification automatically generated in connection with (ix) and (x) are shown in FIGS. 9 and 10. FIG. 9 is a screenshot of a notification automatically sent to a registered user of the system when a product in a user's product profile is subject to a recall notice. FIG. 10 is a wireframe diagram of a screenshot of a notification automatically sent to a user when the user logs into its account if a product in the user's profile has been recalled.

Figure 11:
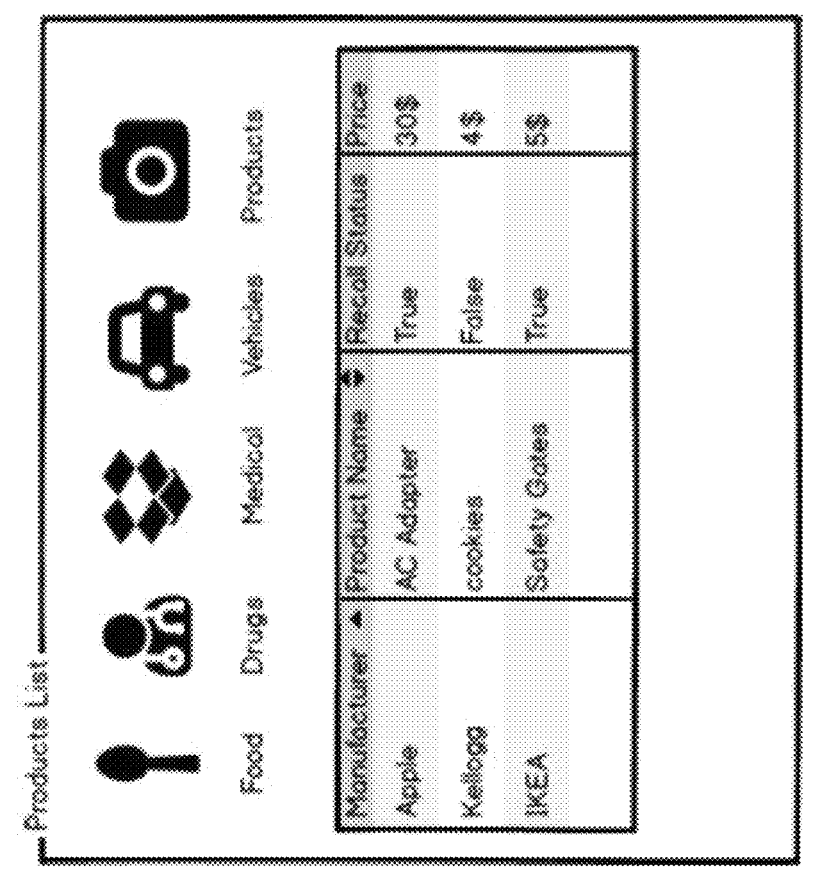

FIG. 11 is a wireframe diagram of a screenshot of a customer's product profile generated by the product center software module and provided to the customer. Note that product classifications, manufacturer, particular products and recall status of particular products are all part of the profile. The customer is also provided a telephone icon to contact the manufacturer directly through the resolution center software module in order to receive payment or replacement of a recalled product, as noted above.

A preferred methodology for providing supplemental product data is wherein one or more additional data elements absent from the recall information received from governmental agency data sources with respect to particular recalled products are identified by comparing the information received with a recalled product data template which includes one or more of a UPC code, a GDIN code, an EAN code, an ASIN code, a GTIN or ISBN, suppliers' addresses, product price information, a SKU code or a MPN code. A recalled product data template may include two or more of the foregoing items and, most preferably, all of the foregoing items in a structured text tabular format.

In a preferred embodiment, the particularity of software modules operate continuously or at predetermined intervals to perform functions (iv), (v), (vi), (vii) and (viii).

Typically, the self-executing computer implemented system for product recall, the one or more databases comprise relational database(s) and the platform data structured format is a structured text tabular format. A suitable structured text tabular format is illustrated schematically in the following table:

| NotificationId | ProductRecallId | RecallNumber | Message |
|---|---|---|---|
| 1 | 1 | 502913 | User Notified of Recall Number502913 |
| 2 | 2 | 422016 | User Notified of Recall Number422016 |
| 3 | 3 | 500801 | User Notified of Recall Number500801 |
| 4 | 4 | 412016 | User Notified of Recall Number412016 |
| 5 | 5 | 502736 | User Notified of Recall Number502736 |

Preferably the system is adapted to accept bar codes or product images to update product information in the one or more databases. So, also, the one or more of the software modules typically operate to transform unstructured data from any of the following formats: unstructured text data, unstructured json data or unstructured xml data or image data to said structured text tabular format and the system is adapted to communicate with a user via a user's digital device. The digital device is selected from a personal computer or a mobile device selected from a smartphone, a tablet, a watch or a digital display in a vehicle console.

In most cases, the system spontaneously captures and stores a product identification selected from: UPC codes; GDIN codes; EAN codes; ASIN codes; SKU codes; Manufacturer Model name, date and Number. Government agency data sources include recall notices issued in electronic form by one or more of the Food and Drug Administration (FDA, USA), Consumer Products Safety Commission (CPSC, USA), National Highway Safety Traffic Administration (NHTSA, USA), U.S. Department of Agriculture (USDA, USA), Environmental Protection Agency (EPA, USA), U.S. Department of Health and Human Services (HHS, USA), US Coast Guard (USCG, USA) and Centers for Disease Control and Prevention (CDC, USA).

Most preferably, user product profiles reside in distinct relational database in structured text tabular format, and the supplier product profiles exist in distinct relational databases in structured text tabular format and wherein further the distinct databases are viewable only by the customer or supplier associated with the distinct relational database or account, as is seen in FIG. 11.

The one or more software modules are preferably operative to inform a product manufacturer or a customer owning a recalled product, including the value of that product, and to communicate a settlement offer to the customer and to electronically provide for payment to the customer upon acceptance of an offer from the manufacturer in order to resolve a claim. Payment may be made by direct deposit in a customer's bank account or by issuing a gift card electronically to the customer, or automatically mailing a check or replacement product, if so desired.

An additional feature is wherein the one or more software modules are operative to spontaneously communicate with a plurality of eCommerce services and obtain one or more additional data elements in a customer product ownership profile absent from the stored product ownership profile and update the customer product ownership profile with supplemental product data relating to particular products in said platform data structured format in said one or more databases.

Figure 12:
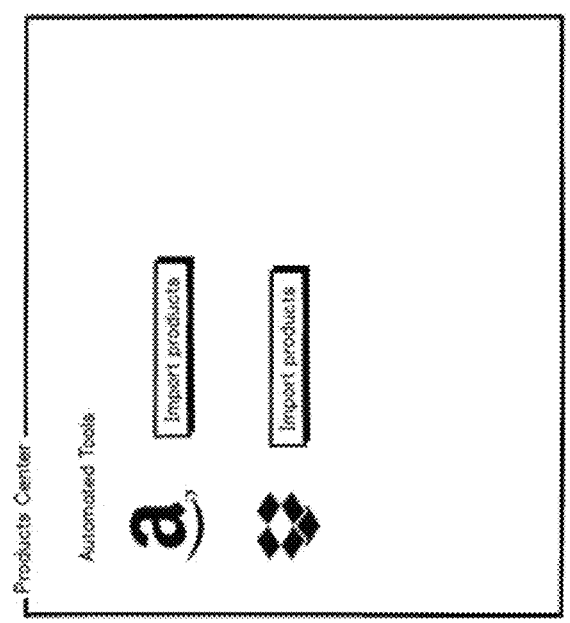
FIG. 12 is a wireframe diagram of a screenshot showing automated tools a system user may apply in order to synchronize its product profiles on the system of the present invention with other eCommerce sites having stored information relating to products owned or of interest to the system user.

The self-executing computer implemented system for product recall management utilizing internet communication may be configured such that the one or more software modules are adapted to update a customer's product profile with additional products residing in a customer's account on an eCommerce website. This particular feature is better understood by reference to FIG. 12 which is a wireframe diagram of a screenshot of a communication to a customer upon login to the customer's account. The customer is invited to update its product profile information by synchronizing its information with information present in that customer's Amazon or eBay account. Upon initiating the synchronization process by clicking the button indicated the system user accesses its eCommerce account through the system of the invention which adds items purchased or followed on the Amazon or eBay account to the customer's product profile and supplements the information by contacting other sites.

In a preferred embodiment, the system includes a product center software module which provides a unique account for each customer which store that customer's product ownership profile and spontaneously notifies said customer when a product in the customer's product ownership profile has been recalled. Typically, a product profile in a customer's product ownership profile in that customer's account includes at least: (i) a product code or number identifying the product; (ii) an identification of the supplier of the product; (iii) pricing information on that product; and (iv) recall status of all of the products in a customer's account. Preferably, the products in a customer's product ownership profile are categorized by type of product, such as consumer products, food products, pharmaceutical products, medical devices and vehicles, as well as optionally including subcategories thereof. The product center software module preferably provides a link for a customer to directly contact a supplier of a recall in that customer's product ownership profile, where a telephone icon provides the link to a supplier. The product center software module also provides spontaneous updates to the recall status of products in a customer's product ownership profile.

Figure 13:
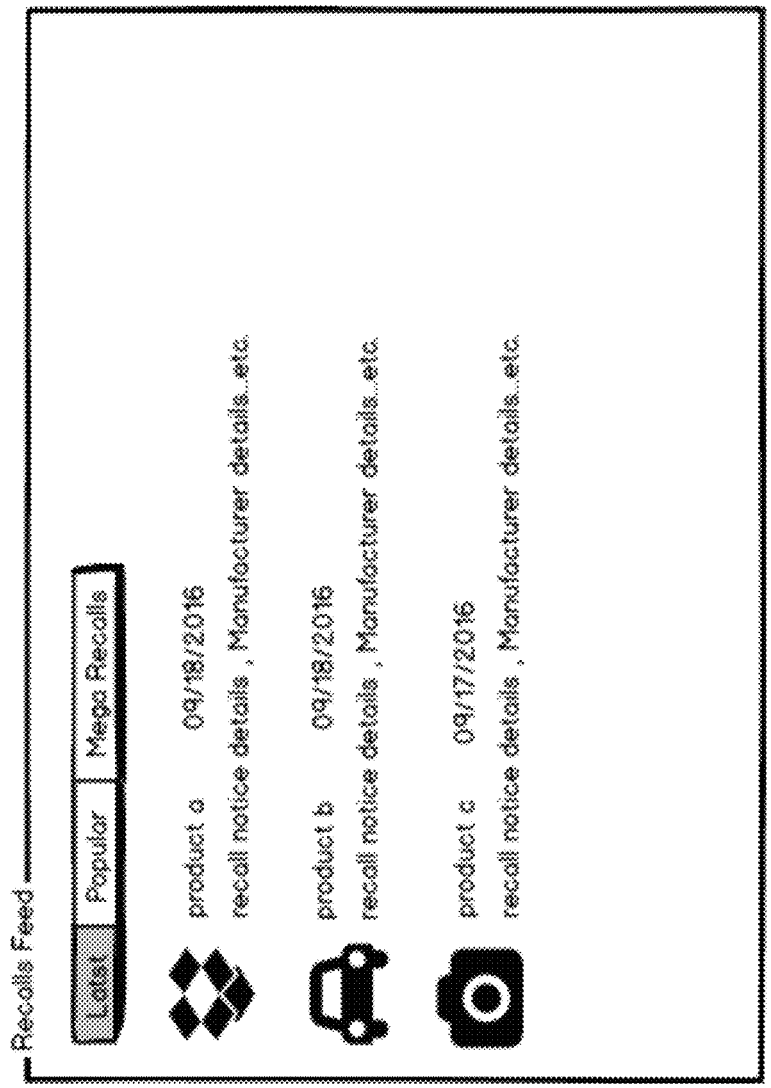
FIG. 13 is an example of recall classification, showing recalled products by category which is viewable by a system user.
Figure 14:
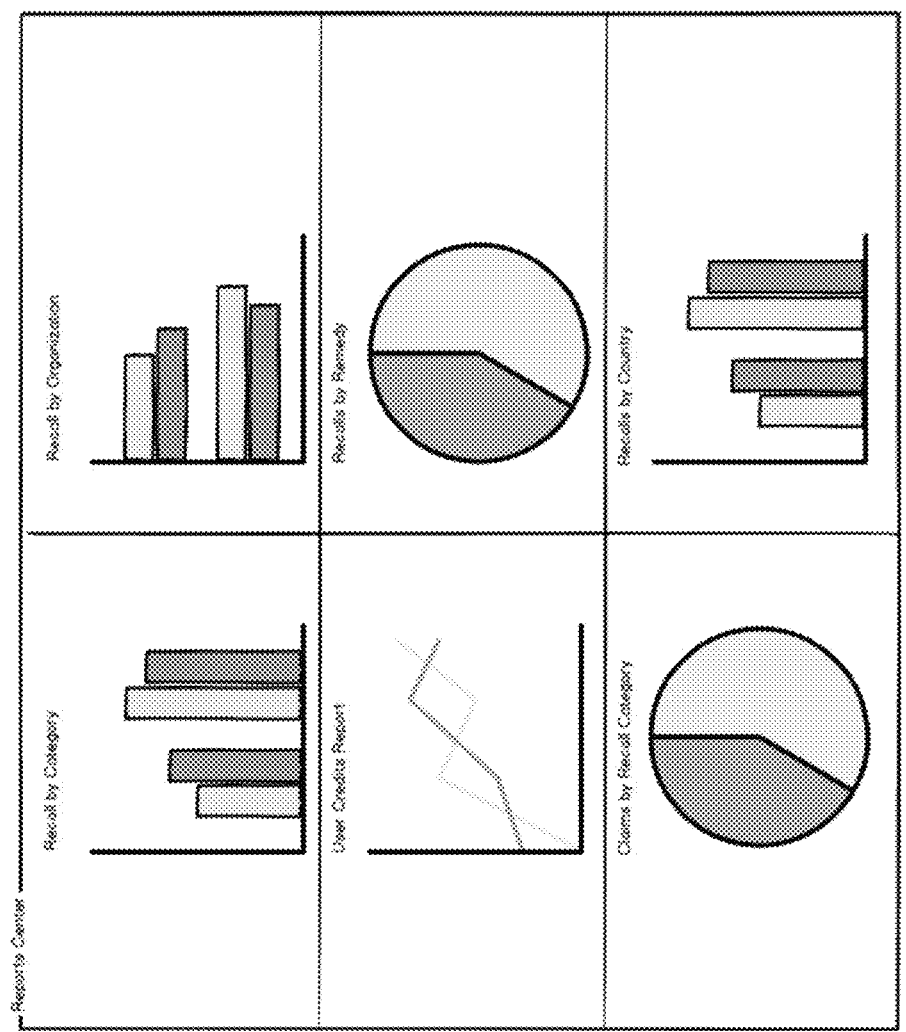
FIG. 14 is a wireframe diagram of a screenshot of various reports available to a system user.

Classification data of recalled products as to product types also allows system users the ability to browse recalled products in the one or more databases by category as is seen in FIG. 13 which is a wireframe diagram of a screenshot of a response to a user requesting recent product recalls. The user then can add the product to its profile and request remedial action, if appropriate. Classification data can also be used by system users for research purposes as is seen in FIG. 14, which is a wireframe diagram of a screenshot of analytics requested by a system user.

In another preferred embodiment, the plurality of software modules includes a resolution center software module, residing in said computer implemented system, wherein said resolution center software module which provides for direct computer messaging directly between customers and suppliers concerning a recall claim submitted through the system by a customer. The resolution center software module provides for remedial action with respect to a recalled product including payment with respect to a recalled product and/or replacement of a recalled product. So, also, the resolution center software module provides suppliers and customers with real time recall claim updates as is seen, for Example, in FIG. 15 which is a wireframe diagram of a screenshot of a report provided to a system user retailer requesting the status of various recall claims. The resolution center software module provides for real time notification to a supplier of a recall claim filed by a customer with respect to a product in the supplier's product profile, so that claims can be promptly resolved.

CONCLUSION, RAMIFICATIONS, AND SCOPE

Accordingly the reader will see that, according to the invention, I have provided a computer implemented system which accelerates the refund, replacement or fix of defective products to customers. A complete product profile is created using external data sources and the extraction of data from images or documents to allow the financial impact of the recall to be tracked.

This is available through extensions to the platform which allow customers to directly communicate with manufacturers to receive the refund as shown in FIG. 5. The resolution center is a communication hub between customers and manufacturers where customers submit claims to be resolved by manufacturers. All resolved claims are handled through the system to replace, refund or fix a recalled product.

While the above description contains many specifications, these should not be construed as limitations on the scope of the invention, but as exemplifications of the presently preferred embodiments thereof. Many other ramifications and variations are possible within the teachings of the invention. For example: a user can submit a receipt of a recalled product through his phone, the system creates a claim, and notify the associated manufacturer for the recalled product. The manufacturer manages all these claims in the resolution center and both parties get notified with any reply or updated to the submitted claims. Another example is that a user gets a notification from the platform for a recalled product, the user chooses to create a claim in the resolution center. The manufacturer finds a customer is eligible for a refund, and resolves the claim by refunding a user with the amount of the recalled product using the payment gateway in the platform.

Thus the scope of the invention should be determined by the appended claims and their legal equivalents, and not by the examples given.

The invention claimed is:

1. A self-executing computer implemented system for product recall management utilizing internet communication comprising:
   (a) one or more databases storing: product recall information associated with recalled products; supplier information associated with a plurality of products, and customer ownership or purchase interest information associated with a plurality of products, said information being stored in a platform data structured format which associates the recall information, the supplier information and the customer ownership or purchase interest information with specific products and wherein supplier information associated with a plurality of particular products stored in the platform data structured format is referred to as a supplier product profile and customer ownership or purchase interest information associated with a plurality of products stored in the platform data structured format is referred to as a customer's product ownership profile;

(b) a plurality of software modules residing in said computer implemented system operating as hereinafter provided;

(c) an application programming interface communicating with (i) said plurality of software modules, (ii) a plurality of external domains, and (iii) a plurality of customers and suppliers, wherein said plurality of software modules residing in said computer system operate to:

(iv) spontaneously download recall information relating to recalled products from a plurality of government agency data sources or manufacturer's data sources over the internet in an unstructured or semi-structured data format; and (v) spontaneously transform the recall information relating to recalled products received from government agency data sources or manufacturer's data sources in an unstructured or semi-structured format to said platform data structured format; and (vi) spontaneously identify one or more additional data elements in a recalled product profile absent from the recall information received from government agency data sources or manufacturer's data sources associated with particular recalled products; and (vii) spontaneously communicate with a plurality of eCommerce services and obtain one or more additional data elements in a recalled product profile absent from the recall information received from government agency data sources or manufacturer's data sources identified in step (vi) with respect to particular recalled products, the data elements thus obtained being referred to as supplemental product data elements; and (viii) spontaneously supplement the recall information relating to particular products received from government agency data sources or manufacturer's data sources with supplemental product data elements obtained in step (vii) to provide combined recall information relating to particular products and save the combined product recall information in said platform data structured format in said one or more databases; and wherein further said plurality of software modules residing in said computer system spontaneously operate to perform at least one of (ix) and (x);

(ix) spontaneously compare combined recall information of step (viii) relating to products in the one or more databases with customer's product ownership profiles residing in said one or databases and upon a match between a product identified in the combined recall information relating to products and a product identified in the customer's product ownership profile, notify a customer that a particular product in its customer ownership product profile is a recalled product wherein the notification optionally includes at least one supplemental product data element automatically obtained in step (vii); or (x) spontaneously compare the combined recall information of step (viii) with a supplier's product profile and customer product ownership profiles stored on said one or more databases and upon a match among a recalled product, a product identified in the supplier's product profile and a product identified in customer's product ownership profile, notify the supplier of a recalled product with identifying information as to customers with the recalled product in their product ownership profile.

2. The self-executing computer implemented system for product recall management utilizing internet communication according to claim 1, wherein one or more additional data elements absent from the recall information received from governmental agency data sources or manufacturer's data sources with respect to particular recalled products are identified by comparing the information received with a recalled product data template which includes one or more of a UPC code, a GDIN code, an EAN code, an ASIN code, a GTIN or ISBN, suppliers' addresses, product price information, a SKU code or a MPN code, or a batch number, expiry date or other dates associated with the product.

3. The self-executing computer implemented system for product recall management utilizing internet communication according to claim 1, wherein said self-executing computer implemented system provides for direct computer messaging directly between customers and suppliers concerning a recall claim submitted through the system by a customer.

4. The self-executing computer implemented system for product recall management utilizing internet communication according to claim 1, and wherein said self-executing computer implemented system spontaneously downloads recall information relating to recalled products from a plurality of government agency data sources or a plurality of manufacturer's data sources over the internet in an unstructured data format.

5. The self-executing computer implemented system for product recall management utilizing internet communication according to claim 1, wherein said self-executing computer implemented system is adapted to update or extract product information from off-line data sources.

6. The self-executing computer implemented system for product recall management utilizing internet communication according to claim 1, wherein the plurality of software modules operate continuously to:

(iv) download recall information relating to recalled products from a plurality of government agency data sources or manufacturer's data sources over the internet in an unstructured or semi-structured data format; and (v) transform the recall information relating to recalled products received from government agency data sources or manufacturer's data sources in an unstructured or semi-structured format to said platform data structured format; and (vi) identify one or more additional data elements in a recalled product profile absent from the recall information received from government agency data sources or manufacturer's data sources associated with particular recalled products; and (vii) communicate with a plurality of eCommerce services and obtain one or more additional data elements in a recalled product profile absent from the recall information received from government agency data sources identified in step (vi) with respect to particular recalled products, the data elements thus obtained being referred to as supplemental product data elements; and (viii) supplement the recall information relating to particular products received from government agency data sources or manufacturer's data sources with supplemental product data elements obtained in step (vii) to provide combined recall information relating to particular products and save the combined product recall information in said platform data structured format in said one or more databases.

7. The self-executing computer implemented system for product recall management utilizing internet communication according to claim 1, wherein the one or more databases comprise relational database(s) and the platform data structured format is a structured text tabular format.

8. The self-executing computer implemented system for product recall management utilizing internet communication according to claim 1, wherein the system is adapted to accept bar codes or product images to update product information in said one or more databases or extract product information from the bar codes or images.

9. The self-executing computer implemented system for product recall management utilizing internet communication according to claim 1, wherein one or more of said software modules operate to transform unstructured or semi-structured data from any of the following formats: unstructured text data or unstructured or semi-structured json data or unstructured or semi-structured xml data or image data to said structured text tabular format.

10. The self-executing computer implemented system for product recall management utilizing internet communication according to claim 1, wherein the system is adapted to communicate with a user via a user's digital device.

11. The self-executing computer implemented system for product recall management utilizing internet communication according to claim 10, wherein the digital device is selected from a personal computer or a mobile device selected from a smartphone, a tablet, a watch, a digital display in a vehicle console, or an IoT device other than a smartphone, a tablet, a watch, or a digital display in a vehicle console.

12. The self-executing computer implemented system for product recall management utilizing internet communication according to claim 1, wherein the system spontaneously captures and stores a product identification selected from: UPC codes; GDIN codes; EAN codes; ASIN codes; SKU codes; Manufacturer Model name, date and Number, manufacturer identification number or product identifier, expiry date, or other dates associated with the product.

13. The self-executing computer implemented system for product recall management utilizing internet communication according to claim 1, wherein the system communicates with government agency data sources and said sources include recall notices issued in electronic form by one or more of the Food and Drug Administration (FDA, USA), Consumer Products Safety Commission (CPSC, USA), National Highway Safety Traffic Administration (NHTSA, USA), U.S. Department of Agriculture (USDA, USA), Environmental Protection Agency (EPA, USA), U.S. Department of Health and Human Services (HHS, USA), US Coast Guard (USCG, USA) and Centers for Disease Control and Prevention (CDC, USA) or manufacturers' data sources.

14. The self-executing computer implemented system for product recall management utilizing internet communication according to claim 1, wherein the customer product ownership profiles reside in distinct database in structured text tabular format, and the supplier product profiles exist in distinct databases in structured text tabular format and wherein further the distinct databases are viewable only by the customer or supplier associated with the distinct database.

15. The self-executing computer implemented system for product recall management utilizing internet communication according to claim 1, wherein the system provides real time recall claim updates, including a status of recall claims.

16. The self-executing computer implemented system for product recall management utilizing internet communication according to claim 1, wherein the one or more software modules are operative to inform a product manufacturer of a customer owning a recalled product, including the value of that product, and to communicate a settlement offer to the customer and to electronically provide for payment to the customer upon acceptance of an offer from the manufacturer in order to resolve a claim.

17. The self-executing computer implemented system for product recall management utilizing internet communication according to claim 1, wherein the one or more software modules are operative to spontaneously communicate with a plurality of eCommerce services and obtain one or more additional data elements in a customer product ownership profile absent from the stored product ownership profile and update the customer product ownership profile with supplemental product data relating to particular products in said platform data structured format in said one or more databases.

18. The self-executing computer implemented system for product recall management utilizing internet communication according to claim 1, wherein the one or more software modules are adapted to update a customer's product profile with additional products residing in a customer's account on an eCommerce website.

19. The self-executing computer implemented system for product recall management utilizing internet communication according to claim 1, wherein a product center software module provides a unique account for each customer which store that customer's product ownership profile and spontaneously notifies said customer when a product in the customer's product ownership profile has been recalled and wherein said self-executing computer implemented system provides for direct computer messaging directly between customers and suppliers concerning a recall claim submitted through the system by a customer.

20. The self-executing computer implemented system for product recall management utilizing internet communication according to claim 1, wherein a resolution center software module which provides direct computer messaging directly between customers and suppliers concerning a recall claim submitted through the system by a customer.

* * * * *